United States Patent [19]

Nesbitt et al.

[11] Patent Number: 4,786,350

[45] Date of Patent: Nov. 22, 1988

[54] METHOD OF MANUFACTURING A WEATHERABLE EXTERIOR SIDING

[75] Inventors: Jeffrey E. Nesbitt, Peach Bottom, Pa.; James E. Pierce, Gloucester, N.J.

[73] Assignee: Pony Industries, Inc., New York, N.Y.

[21] Appl. No.: 38,471

[22] Filed: Apr. 13, 1987

Related U.S. Application Data

[63] Continuation of Ser. No. 745,151, Jul. 17, 1985, abandoned, which is a continuation of Ser. No. 497,549, May 24, 1983, abandoned.

[51] Int. Cl.$^4$ ............................................. B32B 31/00
[52] U.S. Cl. ........................ 156/244.24; 156/244.27; 264/154; 264/259; 264/280; 264/285; 264/320
[58] Field of Search ............. 156/245, 244.11, 244.23, 156/244.27, 244.24, 244.13; 264/177.16, 259, 145, 175, 320, 285, 322, 280, 230; 428/421

[56] References Cited

U.S. PATENT DOCUMENTS

| | | | |
|---|---|---|---|
| 3,133,854 | 5/1964 | Simms | 156/272.6 |
| 3,300,927 | 1/1967 | Bettoli | 428/421 |
| 3,421,971 | 1/1969 | Kamal | 428/421 |
| 3,421,973 | 1/1969 | Kamal | 428/421 |
| 3,709,776 | 1/1973 | Fuchs et al. | 428/421 |
| 3,723,171 | 3/1973 | Fuchs | 428/421 |
| 3,880,690 | 4/1975 | Fuchs et al. | 428/421 |
| 4,201,612 | 5/1980 | Figge et al. | 156/285 |
| 4,215,177 | 7/1980 | Strassel | 156/308.2 |
| 4,317,860 | 3/1982 | Strassel | 156/244.11 |
| 4,337,116 | 6/1982 | Foster et al. | 156/285 |
| 4,364,886 | 12/1982 | Strassel | 264/259 |
| 4,390,489 | 6/1983 | Segal | 264/322 |
| 4,415,519 | 11/1983 | Strassel | 264/171 |

OTHER PUBLICATIONS

E. I. DuPont De Nemours and Company's Bulletin E-37229 "Elvaloy ® Resin Modifiers 837 and 838 Impact Modifiers for Weatherable PVC."

Primary Examiner—Jay H. Woo
Assistant Examiner—Timothy W. Heitbrink
Attorney, Agent, or Firm—E. M. Kozak; A. J. Good; R. L. Taylor

[57] ABSTRACT

A manufacturing process for providing an extruded polyvinyl chloride exterior siding with a weatherable layer of polyvinyl fluoride is disclosed. In a preferred embodiment, the process facilitates the production of dimensionally stable dark colored siding.

11 Claims, No Drawings

METHOD OF MANUFACTURING A WEATHERABLE EXTERIOR SIDING

This is a continuation of application Ser. No. 06/745,151, filed July 17, 1985, now abandoned, which is a continuation of Ser. No. 497,549 filed 5/24/83 now abandoned.

This invention relates to fabricated plastics.

More specifically, this invention relates to a manufacturing process for providing an extruded thermoplastic resin profile with a weatherable coating.

In one of its more specific aspects, this invention pertains to a manufacturing process for providing an extruded rigid polyvinyl chloride exterior siding with a weatherable layer of preferably, polyvinyl fluoride.

The vinyl siding industry continues to search for ways to improve the weatherability, particularly the heat and light stability, of rigid polyvinyl chloride (PVC) siding. Improvements in weatherability have long been sought mainly because improved weatherability would facilitate the production of dark colored vinyl siding. Dark colored PVC siding is not readily available because dark colored PVC siding, as compared to a light colored siding, gets much hotter on the side of a building and this additional heat buildup causes the dark colored siding to degrade and lose its shape. One recent development which reduces siding temperature buildup, improves weatherability and hence makes dark colored siding possible, is the incorporation of infared reflective pigments into the PVC siding compound. However, the high cost of these pigments makes their widespread use unlikely.

It has long been proposed to provide a vinyl siding product with a protective weatherable layer. And, the prime candidate material for the layer has always been polyvinyl fluoride (PVF) due to its excellent combination of properties such as, for example, weather resistance, abrasion resistance, resistance to soiling and solvent resistance. For example, see U.S. Pat. Nos. 3,133,854; 3,300,927; 3,421,971; 3,421,973; 3,709,776; 3,723,171; 3,880,690; and 4,215,177.

For the reasons presented above, it seemed readily apparent that PVC siding having its exposed surfaces coated with PVF should exhibit superior weatherability. In spite of this seemingly obvious solution for improving the weatherability of PVC siding, a commercially acceptable PVF coated PVC siding has long eluded the industry.

The industry's initial efforts to come up with a PVF coated PVC siding were directed to producing a co-extruded siding. These efforts were unsuccessful in that PVF is not readily extrudable. Next, consideration was then given to changing the manufacturing process for PVC siding in order to accommodate lamination. Efforts were directed toward starting with a PVC sheet, laminating PVF to the PVC using a suitable adhesive and molding the PVF/PVC laminate into a conventional exterior siding shape. Although this process resulted in a PVF coated PVC product, the product's dimensional stability was totally unacceptable for exterior siding applications. The biaxial stretching inherent in the sheet formation induced strains in the resulting molded PVC siding and, even the resulting light colored siding proved so dimensionally unstable that it experienced creeping and permanent loss of shape after installation.

The present invention provides a manufacturing method which facilitates the production of a commercial PVF coated PVC siding. Moreover, the manufacturing method of this invention makes possible the production of dimensionally stable dark colored siding.

According to this invention there is provided a method of producing a thermoplastic resin-based shaped article having superimposed on at least one of its surfaces a weatherable layer which method comprises: extruding a compound comprising a thermoplastic resin through a die to form a shaped article; flattening the resulting shaped article to form a substantially flat substrate; laminating a preformed weatherable layer onto the surface of the flattened substrate; and, shaping the resulting laminated substrate into substantially the shape of the extruded shaped article before it was flattened.

Also according to this invention, there is provided a thermoplastic shaped article having a weatherable layer superimposed on at least one of its surfaces produced according to the above-described method.

In a preferred embodiment of this invention, the preformed weatherable layer is polyvinyl fluoride film.

In another preferred embodiment of this invention, the preformed weatherable layer is polyvinylidene fluoride film.

By way of example, this invention will be described in connection with the manufacture of rigid PVC clapboard style exterior siding, although it will be obvious that the method is applicable to extruded profiles, generally, for example, window molding and gutters, and to other styles of exterior siding, for example, any shiplap style.

The method of the present invention can be used with any suitable extrudable thermoplastic polymer, copolymer or alloy. Thermoplastics which can be used in the practice of this invention include: polyvinyl chloride, nylons, fluorocarbonpolymers, linear polyethylene, polypropylene, polyurethane prepolymers, polystyrene, polycarbonate, cellulosic and acrylic resins and the like and copolymers and alloys thereof. For building siding, a rigid PVC compound is the obvious choice due to its commercial availability and low cost.

Suitable for use are those commercially available PVC compounds which are typically designated as exterior profile, extrusion grade rigid PVC compounds. Below are two starting point formulations for siding and profiles taught in E. I. DuPont DeNemours & Company's bulletin E-37229 entitled "ELVALOY ® Resin Modifiers 837 & 838 Impact Modifiers for Weatherable PVC."

| Ingredient | Single Screw Extruder (phr) | Twin Screw Extruder (phr) |
| --- | --- | --- |
| Poly(vinyl Chloride) Resin (0.94 inherent viscosity*) | 100 | 100 |
| Elvaloy ® Resin Modifier 837 or 838 | 5.0–6.0 | 4.0 |
| Stabilizer-"Thermolite ®" 133 | 2.0–3.0 | 1.4–1.6 |
| Process Aid-"Acryloid ®" K120N | 1.0–2.0 | 1.0 |
| Lubricant-"Loxiol ®" G30 | 0–0.8 | — |
| Wax-"Allied Wax" 6-A | 0.2–0.4 | — |
| Wax-"Allied Wax" 400 | 0.5–1.0 | — |
| Lubricant-"Advawax ®" 280 | — | 1.8–2.2 |
| Calcium Stearate | — | 1.3–1.7 |
| Stearic Acid | 0–0.3 | — |
| Surface Treated CaCO₃ | 0–6.0 | — |

-continued

| Ingredient | Single Screw Extruder (phr) | Twin Screw Extruder (phr) |
| --- | --- | --- |
| Titanium Dioxide | 10–12 | 10–12 |

Thermolite, Reg. No. 587,692, M & T Chemicals Inc., is a tin compound used as a stabilizer for chlorine-containing resin.
Acryloid, Reg. No. 1,025,543, Rohm & Haas C., is a synthetic polymeric material for use as an additive to plastic compositions to modify the processing of physical properties of said plastics.
Loxiol, Reg. No. 907,393, Henkel Kommanditgesellschaft, is for esters of alcohols and organic acids.
Allied Waxes 6A and 400 are micro-crystalline waxes from Allied-Signal Co.
Advawax, Reg. No. 439,076, Thiokol Corp., is a mixture of polybutene polymers and hydrocarbon waxes to increase flexibility and prevent brittleness at low temperatures.
*Measured in 0.2 cyclohexanone at 30° C. (86° F.)

Producing a dark colored siding using the method of this invention does not require the use of any special reflective pigments. To produce a dark colored siding according to this invention, simply requires the incorporation of a conventional dark color pigment into the PVC compound.

In the practice of this invention the rigid PVC compound is fed into a conventional single or twin screw type extruder, and extruded at PVC extrusion temperatures and pressures typically from about 385° to 430° F. and, from about 2,000 to about 6,000 psi, through a die set.

The die set for exterior PVC siding is typically of shiplap or clapboard configuration and comprises one or more planes or panels per die set. For example, if the plane or panel height of the clapboard is to be a 5 inch repeat, the standard die configuration typically yields two parallel 5 inch high panels connected by a return angle. This clapboard style is designated in the exterior siding art as double 5 inch clapboard.

The typical gauge of a clapboard die set and accordingly the corresponding wall thickness of the resulting extruded PVC clapboard is within the range of from about 40 to about 55 thousandths of an inch. However, one distinct advantage of profile extrusion is that you can design the die set to extrude more material in some areas of the profile and thus vary the thickness of the profile to provide better rigidity in certain areas.

In one preferred embodiment of this invention in order to impart better rigidity to the PVC siding at least one rigidizing strip or rib of from about 5 to 50 thousandths over wall thickness is extruded into the shade lap area of the siding, preferably, on the back side of the siding panel, that is, the side placed next to the building. The shade lap area is the area of the siding which is shaded by the protruding return angle or overlap of the next higher panel. The rigidizing strip is placed in the shade lap for aesthetic reasons.

As the clapboard profile exits the die set it is allowed to cool at least slightly to a temperature within the range of from about 250° to 420° F., preferably from about 350 to about 375° F. If much cooling is desired, a tempering air shower or water spray can be directed on the profile surface. It is preferred that the profile be at a minimum temperature of about 350° F. when it is flattened.

The flattening of the extruded clapboard profile can be carried out using any conventional method such as pulling the clapboard profile through a nip formed by a pair of rolls with a hydraulic pressure imparted across the rolls. To flatten a conventional gauge (40–55 thousandths) siding the two rolls forming the nip are touching or spaced apart a distance which is less than the thickness of the siding, that is, up to about 50 thousandths.

The lamination of the PVF to the flattened substrate can be carried out using any conventional method of lamination taught, for example, in the above referenced patents. Conveniently, if desired, the rolls used to flatten the profile can also be used to simultaneously laminate an adhesive coated preformed polyvinyl fluoride or polyvinylidene fluoride film to the flattened top surface of the substrate as follows.

As the profile is pulled between the rolls, an adhesive coated PVF film is simultaneously pulled under the top roll from a tension roll mounted, preferably, above the top roll. The adhesive coated side of the PVF film is faced toward the flattened surface of the profile, that is, the top surface or the surface to be faced toward the weather, rather than against the building. As the profile and the PVF film are simultaneously drawn through the nip, the rolls serve to sequentially or almost simultaneously flatten the profile and adhere or laminate the film to the resulting flattened substrate and form a laminated product. The top roll can be a conventional stainless steel roll. However, to avoid slippage of the PVF film, it is preferred that the bottom roll not be stainless steel. And, a rubber bottom roll has been found particularly suitable for use.

Any suitable adhesive for bonding PVC and PVF can be employed. Particularly suitable adhesives are thermoplastic acrylic, solvent borne adhesives which are heat activated.

After the PVF coated PVC substrate exits the nip it is shaped into the identical extruded shape it had before flattening and lamination. This sequence of extruding the desired finished product shape, followed by flattening for lamination, laminating and then reshaping as if the flattening had not occurred is extremely critical to obtaining a dimensionally stable PVF siding product. By going through this unusual sequence, the finished siding avoids the induced strains resulting from the biaxial stretching of sheet formation which resulted in unsuccessful prior attempts to produce a stable PVF coated PVC siding product.

The reshaping of the PVF coated PVC substrate can be done using any method of sizing conventionally employed in forming extruded PVC siding. Typically, the reforming will be done while the substrate is within the temperature range of from about 225 to about 300° F. For example, the PVF coated PVC substrate can be pulled through water lubricated vacuum fixtures which reshape the laminated substrate into substantially the clapboard configuration of the extruder die set. The actual size of the vacuum fixture will be from about 5 to about 20 percent smaller in all dimensions than the extruder die.

If as described above, certain areas of the siding product are thicker than other areas, for example, a rigidizing strip or rib, it is necessary to address water onto the thicker areas to equalize the cooling of the clapboard and thus avoid bowing which results from uneven cooling.

As the clapboard having a PVF layer on its exposed surfaces exits the vacuum shoes, excess surface water is removed, nail slots are punched and the clapboard siding is packaged.

The following example sets forth the best mode for practicing this invention.

EXAMPLE

An extrusion profile, exterior grade rigid polyvinyl chloride compound comprised of in phr, 100 general purpose polyvinyl chloride resin, 0.8 tin mercaptide stabilizer, 6.0 acrylic impact modifier, 1.0 processing aid, 2.25 lubricant, 1.7 calcium stearate and 10.0 filler was vacuum fed from a hopper into a Cincinnati Milacron twin screw extruder and extruded at an extrusion speed of about 30 ft/minute through a primary die set of double 5 inch clapboard configuration at a pressure of about 5,000 psi. The remperature of the profile as it exited the die set was about 410° F. as measured by a radiation pyrometer.

The extruded profile was then passed under a tempering air shower which served to reduce the temperature of the extrudate to about 360° F. at which temperature it was pulled through a nip formed between a stainless steel top roll and a rubber bottom roll spaced 5 to 15 thousandths inch apart. The hydraulic pressure across the top roll was about 200 psi.

The resulting profile was flattened as the result of being pulled between the nip rolls. Substantially simultaneously with flattening, a 1.5 mil thick film of PVF (Tedlar®)[1], back cast with a heat activated thermoplastic acrylic solvent borne adhesive (DuPont "68080" Adhesive), being fed under the top roll and above the top surface of the substrate was laminated to the surface of the substrate by the heat and pressure of the nip rolls.

[1] Tedlar is a trademark for PVF film by E. I. duPont de Nemours & Co.

The resulting PVF coated PVC substrate was then pulled through water lubricated vacuum shoes, which were calibrated to be about 14% smaller in all dimensions than the extruder die.

The sized product exiting the vacuum shoes was punched to provide nail slots and was recovered as a PVF coated PVC siding product of double 5 inch clapboard style having a wall thickness of about 46–47 thousandths of an inch.

It will be evident from the foregoing that various modifications can be made to this invention. Such, however, are considered to be within the scope of the invention.

What is claimed is:

1. A method of producing a thermoplastic resin-based shaped profile having superimposed on at least one of its surfaces a polyvinyl fluoride or polyvinylidene fluoride weatherable layer which method comprises:
    (a) extruding a compound comprising a thermoplastic resin through a die set having more than one plane to form a non-planar shaped profile:
    (b) flattening the resulting non-planar shaped profile to form a substantially flat substrate;
    (c) laminating a preformed weatherable layer comprised of polyvinyl fluoride or polyvinylidene fluoride onto the surface of the flattened substrate; and
    (d) shaping the resulting laminated substrate into substantially the shape of the extruded non-planar shaped profile before it was flattened.

2. The method of claim 1 in which said ccompound is a polyvinyl chloride compound.

3. The method of claim 1 in which said flattening to form a substantially flat substrate is done by passing the non-planar shaped profile through a nip formed by a pair of rolls.

4. The method of claim 1 in which said laminating a preformed weatherable layer onto the surface of the flattened substrate is done by passing said weatherable layer and said substrate through a nip formed by a pair of rolls.

5. The method of claim 1 in which said flattening and said laminating steps are performed substantially simultaneously.

6. The method of claim 5 in which said shaping the resulting laminated substrate into substantially the shape of the extruded non-planar profile article before it was flattened is done by passing said laminated substrate through vacuum fixtures.

7. The method of claim 6 in which said vacuum fixtures are within the range of from about 5 to about 20 percent smaller in all dimensions than the extruder die.

8. The method of claim 1 in which the temperature of said non-planar shaped profile extrudate is within the range of from about 250° to about 420° F. when it is flattened.

9. The method of claim 2 in which the temperature of said non-planar shaped profile extrudate is within the range of from about 350° to about 375° F. when it is flattened.

10. The method of claim 4 in which the roll carrying the substantially flat substrate is rubber.

11. The method of claim 2 in which said polyvinyl chloride compound comprises a dark color pigment.

* * * * *